US011401202B2

(12) United States Patent
Lehuede et al.

(10) Patent No.: US 11,401,202 B2
(45) Date of Patent: Aug. 2, 2022

(54) β-SPODUMENE GLASS-CERAMICS THAT ARE WHITE, OPALESCENT, OR OPAQUE, WITH LOW TITANIUM CONTENT, AND TIN-FINED (71) Applicant: Eurokera, Jouarre (FR)

(72) Inventors: Philippe Lehuede, Dammarie-les-Lys (FR); Marie Comte, Fontenay aux Roses (FR)

(73) Assignee: Eurokera, Jouarre (FR)

( * ) Notice: Subject to any disclaimer, the term of this patent is extended or adjusted under 35 U.S.C. 154(b) by 0 days.

(21) Appl. No.: 16/632,740

(22) PCT Filed: Jul. 19, 2018

(86) PCT No.: PCT/EP2018/069687
§ 371 (c)(1),
(2) Date: Jan. 21, 2020

(87) PCT Pub. No.: WO2019/016338
PCT Pub. Date: Jan. 24, 2019

(65) Prior Publication Data
US 2021/0147282 A1    May 20, 2021

(30) Foreign Application Priority Data

Jul. 21, 2017  (FR) ...................................... 1756930

(51) Int. Cl.
*C03C 10/00*  (2006.01)
*C03B 32/02*  (2006.01)
(Continued)

(52) U.S. Cl.
CPC ......... *C03C 10/0027* (2013.01); *A47J 27/002* (2013.01); *A47J 36/027* (2013.01);
(Continued)

(58) Field of Classification Search
CPC ............ C03C 10/0027; C03C 10/0054; C03C 2204/00; A47J 27/002; A47J 36/027; A47J 36/04; C03B 32/02; H05B 3/141
See application file for complete search history.

(56) References Cited

U.S. PATENT DOCUMENTS 5,070,045 A    12/1991  Comte et al.
6,846,760 B2    1/2005  Siebers et al.
(Continued)

FOREIGN PATENT DOCUMENTS

CN    101269911 A    9/2008
CN    102036926 A    4/2011
(Continued)

OTHER PUBLICATIONS

International Search Report and Written Opinion pertaining to PCT/EP2018/069687 dated Aug. 16, 2018.
(Continued)

*Primary Examiner* — Karl E Group
*Assistant Examiner* — Cameron K Miller
(74) *Attorney, Agent, or Firm* — Dinsmore & Shohl LLP (57) ABSTRACT

The present application relates to glass-ceramics that are white, opalescent or opaque, of the lithium aluminosilicate (LAS) type, containing a solid solution of β-spodumene as the main crystalline phase. The application also provides articles that are constituted, at least in part, of said glass-ceramics, precursor glasses for said glass-ceramics, and a method of preparing said article. Said glass-ceramics have a composition that is free from arsenic oxide and antimony oxide, with the exception of inevitable traces, and that contains the following, expressed as percentages by weight of oxides: 60% to 70% of $SiO_2$, 18% to 23% of $Al_2O_3$, 3.0% to 4.3% of $Li_2O$, 0 to 2% of $MgO$, 1 to 4% of $ZnO$, 0 to 4% of $BaO$, 0 to 4% of $SrO$, 0 to 2% of $CaO$, 1.3% to 1.75% of (Continued)

TiO$_2$, 1% to 2% of ZrO$_2$, 0.05% to 0.6% of SnO$_2$, 0 to 2% of Na$_2$O, 0 to 2% of K$_2$O, 0 to 2% of P$_2$O$_5$, 0 to 2% of B$_2$O$_3$, with Na$_2$O+K$_2$O+BaO+SrO+CaO≤6% and Na$_2$O+K$_2$O≤2%, and a maximum of 500 ppm of Fe$_2$O$_3$.

14 Claims, 3 Drawing Sheets

(51) Int. Cl.
*A47J 36/04* (2006.01)
*A47J 36/02* (2006.01)
*A47J 27/00* (2006.01)
*H05B 3/14* (2006.01)

(52) U.S. Cl.
CPC .............. *A47J 36/04* (2013.01); *C03B 32/02* (2013.01); *C03C 10/0054* (2013.01); *H05B 3/141* (2013.01); *C03C 2204/00* (2013.01)

(56) References Cited

U.S. PATENT DOCUMENTS

| | | |
|---|---|---|
| 8,053,381 B2 | 11/2011 | Siebers et al. |
| 8,685,873 B2 | 4/2014 | Siebers et al. |
| 2007/0213192 A1 | 9/2007 | Monique Comte et al. |
| 2010/0099546 A1 | 4/2010 | Aitken et al. |
| 2010/0167903 A1 | 7/2010 | Comte et al. |
| 2013/0130887 A1 | 5/2013 | Nakane et al. |
| 2013/0225388 A1 | 8/2013 | Nakane et al. |
| 2016/0130175 A1 | 5/2016 | Siebers et al. |

FOREIGN PATENT DOCUMENTS

| | | | |
|---|---|---|---|
| CN | 105209400 A | 12/2015 | |
| CN | 106795039 A | 5/2017 | |
| EP | 0931028 B1 | 3/2003 | |
| EP | 2284131 A1 * | 2/2011 | ......... C03C 10/0009 |
| EP | 2284131 A1 | 2/2011 | |
| FR | 2864071 A1 | 6/2005 | |
| FR | 3025793 A1 | 3/2016 | |
| JP | 2003-300752 A | 10/2003 | |
| WO | 2012156444 A1 | 11/2012 | |
| WO | 2013171288 A1 | 11/2013 | |
| WO | 2014132122 A2 | 9/2014 | |
| WO | 2016193171 A1 | 12/2016 | |

OTHER PUBLICATIONS

Chinese Patent Application No. 201880049153.1, Office Action dated Sep. 30, 2021, 9 pages English Translation Only, Chinese Patent Office.

* cited by examiner

β-SPODUMENE GLASS-CERAMICS THAT ARE WHITE, OPALESCENT, OR OPAQUE, WITH LOW TITANIUM CONTENT, AND TIN-FINED

This application is a national stage entry of PCT/EP2018/069687 filed Jul. 19, 2018, which claims the benefit of priority under 35 U.S.C. § 119 of French Patent Application Serial No. 17 56930 filed on Jul. 21, 2017 the content of which is relied upon and incorporated herein by reference in its entirety.

The context of the present application is that of low expansion glass-ceramics that are white, opalescent or opaque, and containing a solid solution of β-spodumene as the main crystalline phase. More particularly, the present application relates to:

glass-ceramics that are white, opalescent or opaque, of the lithium aluminosilicate (LAS) type containing a solid solution of β-spodumene as the main crystalline phase;
articles that are constituted, at least in part, of these glass-ceramics;
lithium aluminosilicate glasses, precursors for these glass-ceramics; and
a method of preparing these articles.

Low expansion glass-ceramics, of the lithium aluminosilicate (LAS) type containing a solid solution of β-quartz or β-spodumene as the main crystalline phase that are transparent, opalescent or opaque, and optionally colored, have existed for a long time (glass-ceramics of the lithium aluminosilicate (LAS) type containing a solid solution of β-quartz or β-spodumene as main crystalline phase are often respectively referred to as β-quartz or β-spodumene glass-ceramics (more particularly further in the present text)). They are described in numerous patent documents, and in particular in U.S. Pat. No. 5,070,045 and patent applications EP 0 931 028 and WO 2012/156444. They are used in particular appliances as the material for constituting cooktops (where said cooktops may exist in different varieties, in particular presenting two smooth main faces, or else one smooth main face and one main face with protuberances), microwave oven plates, fireplace windows, fireplace inserts, stove windows and oven doors (in particular for pyrolytic and catalytic ovens), fire windows, and worktops.

In order to obtain such glass-ceramics (and more precisely in order to eliminate inclusions of gas within the precursor molten glass), conventional fining agents, $As_2O_3$ and/or $Sb_2O_3$, have been used for a long time. Given the toxicity of those two compounds and the ever stricter regulations in force, it is desired to avoid using those (toxic) fining agents in the fabrication of the precursor glass. For environmental considerations, the use of halogens such as F and Br, which could take the place at least in part of said conventional fining agents $As_2O_3$ and $Sb_2O_3$, is also not desirable. $SnO_2$ has been proposed as a substitute fining agent (see in particular the teachings of patent documents U.S. Pat. Nos. 6,846,760, 8,053,381, and WO 2012/156444). It is being used more and more. Nevertheless, at similar fining temperatures, it is found to be less effective than $As_2O_3$ (and in absolute terms, it is therefore appropriate to use it in relatively large quantity in order to mitigate its lesser effectiveness, and that is not without raising problems, more particularly of devitrification) and it is responsible for the appearance of undesirable coloring during ceramming (coloring that would be the result of Sn—Fe, Sn—Ti, and Ti—Fe interactions (by charge transfer)). This is yellowy coloring for transparent n-quartz glass-ceramics. There have thus been many proposals for tin-fined β-quartz transparent glass-ceramics that are dark in color (in particular black) or for such tin-fined β-quartz transparent glass-ceramics that are colorless as a result of specific features of their compositions (presence of compensating coloring agent(s) in their compositions (U.S. Pat. Nos. 8,053,381 and 8,685,873); limited presence of $TiO_2$ (US 2010/0167903), or no $TiO_2$ (US 2010/0099546); limited or even zero presence of MgO+ low content of $Fe_2O_3$+small crystallites (WO 2013/171288)); combined presence of $Li_2O$ and CaO with a condition concerning the ratio $(MgO+Na_2O+K_2O)/Li_2O$+ low content of $Fe_2O_3$ small crystallites (WO 2016/193171)).

β-spodumene glass-ceramics that are white, opalescent or opaque exist already. So far as the Applicant is aware, their precursor glasses are usually fined with arsenic. In particular, the Applicant sells such β-spodumene glass-ceramics (for cooktop applications) that are white and opalescent under the names: Kerawhite® (=KW) (L* (lightness, see below)≈87-88 and Y (integrated total transmission (see below)≈10%-12%), and Kerawhite Touch Control® (=KWTC) (L*≈81-83 and Y≈18%-20%; because of this higher value for Y, cooktops made of said glass-ceramics pass the red light emitted by LEDs arranged under said cooktops). Those two β-spodumene glass-ceramics are obtained from the same precursor glass but with different ceramming heat treatments. Said precursor glass for said glass-ceramics is fined with arsenic. Tin-fined precursor glasses of the same type do not enable β-spodumene glass-ceramics to be obtained that are white; the corresponding β-spodumene glass-ceramics have a gray-green color (see Table 2 below).

With reference to the heating means associated with glass-ceramic cooktops (radiant heaters or induction heaters), there are requirements concerning values for the (linear) coefficient of thermal expansion (CTE) of the material constituting the plates that are severe to a greater or lesser extent. Glass-ceramic cooktops used with radiant heaters can be raised to temperatures as high as 725° C., and in order to withstand the thermal shocks and thermal gradients that are created within them, the CTEs of their constitutive glass-ceramic are advantageously as small as possible. The β-spodumene glass-ceramics used with radiant heater means thus generally present a $CTE_{20-700° C.}$ of at most $12 \times 10^{-7}$ per Kelvin ($K^{-1}$). Glass-ceramic cooktops used with induction heaters are subjected to temperatures that are lower (at most about 450° C., or even at most about 300° C. (a new generation of inductors making use of infrared sensors has recently appeared; by using these infrared sensors, the temperature of the glass-ceramic cooktops is better controlled)). The thermal shocks to which the glass-ceramic cooktops used with induction heaters are subjected are thus less violent; the glass-ceramic concerned can have CTEs that are greater.

In such a context, the Applicant has investigated the technical problem of using precursor glasses that are fined with tin to obtain glass-ceramics that are white, opalescent, or opaque, of the lithium aluminosilicate (LAS) type, containing a solid solution of β-spodumene as the main crystalline phase.

Numerous prior art documents describe glass-ceramics, and in particular:
patent application US 2007/0213192: that document describes glass-ceramics of the LAS type, containing a solid solution of β-spodumene as the main crystalline phase, that are white and opaque, of which the precursor glass is fined with tin and of which the composition contains 2% to 5% by weight of Ti$_2$O (the exemplified compositions contain a minimum of 2.6% by weight of TiO$_2$);

patent application EP 2 284 131 discloses crystallizable glasses and crystallized corresponding glasses, the composition of which is broadly defined. Said composition is optimized in reference to the technical problem of the devitrification of the crystallizable glasses when formed into shape by a float process. This document more particularly discloses crystallized glasses of the lithium aluminosilicate (LAS)type that are transparent and contain a solid solution of β-quartz as the main crystalline phase and crystallized glasses of the lithium aluminosilicate (LAS) type that are white and opaque and contain a solid solution of β-spodumene as the main crystalline phase. Neither the whiteness, nor the opacity of these crystallized glasses is specified. No opalescent crystallized glass is disclosed;

patent application US 2013/0130887: that document describes LAS type glass-ceramics containing a solid solution of β-quartz as the main crystalline phase (transparent glass-ceramics) or containing a solid solution of β-spodumene as the main crystalline phase (white glass-ceramics), of which the precursor glass is fined with tin and of which the composition contains 1.5% to 3% by weight of Ti$_2$O. All of the exemplified glass-ceramics that contain a solid solution of β-spodumene as the main crystalline phase contain 2% by weight of TiO$_2$ in their composition (furthermore, their whiteness is not defined). A comparative example 5 illustrating a value of 1.4% by weight for TiO$_2$ relates to a β-quartz glass-ceramic that is transparent and yellowish;

patent application US 2013/0225388: that document describes LAS type glass-ceramics containing a solid solution of β-quartz as the main crystalline phase (transparent glass-ceramics), of which the precursor glass is fined using tin and of which the composition contains 1.5% to 2.8% by weight of Ti$_2$O (all the examples corresponding to the invention claimed in this prior art document illustrate the value 2%; a comparative example 6 which illustrates the value of 1.3% relates to a glass-ceramic that is opalescent, for which neither the nature of the main crystalline phase, nor the opalescence, nor the hue, are specified);

patent application WO 2014/132122: that document describes LAS type glass-ceramics containing a solid solution of β-spodumene as the main crystalline phase, of which the precursor glass is fined with tin, and having a gray-brown color (with a low lightness). The compositions described contain 1.5% to 4% by weight of Ti$_2$O; the exemplified compositions contain 3% by weight of Ti$_2$O and also contain 0.15% by weight of at least one of the following coloring oxides: V$_2$O$_5$, CoO, Cr$_2$O$_3$, and Fe$_2$O$_3$; and patent application US 2016/0130175: in its examples 19-22, that document describes LAS type glass-ceramics containing a solid solution of β-spodumene as the main crystalline phase, of which the precursor glass is fined using tin and of which composition contains more than 2% by weight of Ti$_2$O. The glass-ceramics of examples 19 and 21 are opalescent, presenting gray coloring.

In such a context, the Applicant proposes glass-ceramics that are white, opalescent or opaque, of the lithium aluminosilicate (LAS) type, containing a solid solution of β-spodumene as the main crystalline phase, and of which the composition contains neither arsenic nor antimony.

Furthermore, said glass-ceramics are advantageous in that:

1) in addition to their whiteness and opalescent or opaque appearance, they possess advantageous properties adapted to the intended applications, and more particularly as a material for constituting cooktops, i.e.:

a) a (linear) coefficient of thermal expansion (CTE$_{20-700°\ C.}$, often referred as CTE in the present text) that is small: CTE$_{20-700°\ C.}$≤20×10$^{-7}$/° C., or even ≤15×10$^{-7}$/° C., or even ≤12×10$^{-7}$/° C. It can be understood that glass-ceramics with a CTE$_{20-700°\ C.}$≤12× 10$^{-7}$/° C. are suitable as material for constituting cooktops for associating with radiant heaters (as well as material for constituting supports or trays within furnaces for heat treatment), while glass-ceramics having a greater CTE (see the above-specified values) are suitable as material for constituting cooktops for associating with induction heaters; and b) satisfactory mechanical properties, with good high-temperature aging;

and 2) can be obtained under industrial conditions that are close or similar to those implemented at present while using As$_2$O$_3$ and/or Sb$_2$O$_3$ (i.e. from precursor glasses presenting low viscosity at high temperature (T$_{30\ Pa·s}$<1660° C.) (which facilitates fining) and high viscosity at the liquidus (>300 pascal-seconds (Pa·s) (=>3000 P) (which facilitates forming)).

It is also appropriate that, according to some embodiments, more particularly adapted to specific utilization contexts (see below), glass-ceramics of the present application, materials constituting cooktops, present appropriate transmission at specific wavelengths: particularly at 1600 nanometers (nm) (T$_{1600\ nm}$ greater than 50%), in order to enable good heating performance of the cooktops, with radiant heating, without leading to dangerous temperature rises of materials placed in the proximity of the cooktops, and at 625 nm (T$_{625\ nm}$ greater than 10%) in order to pass light from a LED placed under the cooktops for display purposes, and emitting red light.

In its first aspect, the present application thus relates to glass-ceramics that are white, opalescent or opaque, of the lithium aluminosilicate (LAS) type, containing a solid solution of β-spodumene as the main crystalline phase, and the composition of which, free of arsenic oxide and antimony oxide, with the exception of inevitable traces, comprises, expressed as percentages by weight of oxides:

60% to 70% of SiO$_2$,
18% to 23% of Al$_2$O$_3$,
3.0% to 4.3% of Li$_2$O,
0 to 2% of MgO,
1 to 4% of ZnO,
0 to 4% of BaO,
0 to 4% of SrO,
0 to 2% of CaO,
1.3% to 1.75% of TiO$_2$,
1% to 2% of ZrO$_2$,
0.05% to 0.6% of SnO$_2$,
0 to 2% of Na$_2$O,
0 to 2% of K$_2$O,
0 to 2% of P$_2$O$_5$,
0 to 2% of B$_2$O$_3$, with Na$_2$O+K$_2$O+BaO+SrO+CaO≤6% and Na$_2$O+K$_2$O≤2%, and a maximum of 500 parts per million (ppm) of Fe$_2$O$_3$.

It thus relates to glass-ceramics that:
are of the lithium aluminosilicate (LAS) type: they contain $Li_2O$, $Al_2O_3$, and $SiO_2$ as essential ingredients of the solid solution of β-spodumene (see below);
contain a solid solution of β-spodumene as the main crystalline phase: said solid solution of β-spodumene representing more than 80% by weight of the total crystallized fraction. It generally represents more than 90% by weight of said total crystallized fraction;
are white: where whiteness is accessed herein in a manner that is of no surprise to the person skilled in the art, by using the colorimetry coordinates of the CIELAB system $L^*$ (=lightness), and $a^*$ and $b^*$ (=hue), measured using a colorimeter in reflection mode, under illuminant D65 with observation at 10°, on a sample having a thickness (e) lying in the range 2 mm to 6 mm (2 mm≤e≤6 mm). It is quantified as follows. The glass-ceramics of the present application are white insofar as their colimetric coordinates $L^*$, $a^*$, and $b^*$ are such that:

$$L^* \geq 80,$$

$$-3 \leq a^* \leq +3, \text{ and preferably } -2 \leq a^* \leq +2, \text{ and}$$

$$-3 \leq b^* \leq +5, \text{ and preferably } -2 \leq b^* \leq +2;$$

are opalescent or opaque: their aspect is assessed herein, in a manner that is of no surprise to the person skilled in the art, by the integrated total transmission (Y (or TL) (%)) and the level of haze or diffusion percentage. By way of example, transmission and diffusion are measured by using a spectrophotometer fitted with an integrating sphere of a diameter of 150 mm. On the basis of those measurements, the following are calculated: said integrated total transmission in the visible spectrum (in the range 380 nm to 780 nm) in the XYZ color space and the level of haze (using the ASTM D 1003-13 standard (under illuminant D65, with a 2° observer, and a sample of a thickness (e) lying in the range 2 mm to 6 mm (2 mm≤e≤6 mm)). Said integrated total transmission and said haze level are quantified as follows. The glass-ceramics of the present application are opalescent insofar as their integrated total transmission is less than or equal to 28% (Y≤28%) and their haze level is greater than 80% (said haze level is advantageously greater than or equal to 90%). The glass-ceramics of the present application are opaque insofar as their integrated transmission is less than or equal to 3% (Y≤3%) and their haze level greater than 90% (said haze level is advantageously greater than or equal to 95%). It may appropriately be recalled at this point that the integrated total transmission (Y) of a glass-ceramic may be adjusted by modifying the crystallization treatment: this transmission (Y) diminishes with increasing times and crystallization temperatures. It is also well known to the person skilled in the art that the total integrated transmission values (Y) and lightness values ($L^*$) are not independent: as said transmission (Y) decreases, said lightness ($L^*$) increases (the material appears to be whiter). Thus, it was not obvious in any way to obtain β-spodumene glass-ceramics, with tin fining of their precursor glass, presenting simultaneously lightness values $L^* \geq 80$ and total integrated transmission values (Y) that are still relatively high (≥18); and
of composition as specified above. Concerning said composition, the following can already be emphasized. It thus contains neither $As_2O_3$ nor $Sb_2O_3$, or contains only traces of at least one of those toxic compounds. $SnO_2$ is present instead of and replacing those conventional fining agents. If traces of at least one of those compounds are present, they are present as contamination; by way of example, this may be due to the presence of recycled materials of the cullet type (i.e. coming from old glass-ceramics that were fined using those compounds) in the charge of raw materials to vitrify. In any event, only traces of those toxic compounds may be present: $As_2O_3+Sb_2O_3<1000$ ppm.

Concerning each of the ingredients forming part of (or potentially forming part of) the above-specified compositions at the specified contents (where the top and bottom extreme values for each of the ranges specified (above and below) are included within those ranges), the following may be specified.

$SiO_2$ (60% to 70%): a too high content of $SiO_2$ (>70%) leads to a precursor glass that is difficult to melt because of its high viscosity, whereas too small a content of $SiO_2$ (<60%) leads to low viscosities at the liquidus.

$Al_2O_3$ (18% to 23%): a too high content of $Al_2O_3$ (>23%) leads to unacceptable devitrification, while too low a content of $Al_2O_3$ (<18%) leads to an insufficient amount of β-spodumene solid solution.

It has also been observed that this element has a great influence on the rate of crystallization (an increase in the content of $Al_2O_3$ tends to slow down crystallization (which leads to increasing the maximum ceramming temperature and/or the ceramming time)). That is why, in order to obtain an opaque material of high lightness, it is preferable to have contents of $Al_2O_3$ that are less than or equal to 20% and in order to obtain a material that is opalescent, it is preferable to have contents of $Al_2O_3$ that are greater than 20%.

$Li_2O$ (3.0% to 4.3%): this element reduces the viscosity of the precursor glass at high temperature and reduces the CTE of the glass-ceramic. Nevertheless, too high a content of $Li_2O$ (>4.3%) leads to unacceptable devitrification.

MgO (0 to 2%): this element is advantageously (but not necessarily) present. In order to be effective, when present, it must generally be present at a content of at least 0.1%. Otherwise stated, MgO is "not present" or is efficiently present, generally in the range 0.1 to 2%. It serves to decrease the viscosity of the precursor glass at high temperature. With too high a quantity (>2%), MgO increases the CTE of glass-ceramics. It has also been observed that increasing the content of this element increases crystallization rates. Thus, in a context of glass-ceramics that are opalescent, it is advantageously present at no more than 1.2% (with more than 20% $Al_2O_3$ (see above)). In a context of glass-ceramics that are opaque, it is advantageously present at more than 1.2% (with no more than 20% $Al_2O_3$ (see above)). As mentioned, these conditions relating to the quantities of MgO and of $Al_2O_3$ are advantageous respectively for glass-ceramics that are opalescent and for glass-ceramics that are opaque. Under no circumstances are they compulsory. It is thus entirely possible, while performing suitable ceramming treatment, to obtain glass-ceramics that are opaque with a composition that contains less than 1.2% of MgO with more than 20% of $Al_2O_3$ (see the glass-ceramic 13d below).

ZnO (1% to 4%): this element also serves to reduce the viscosity of glass at high temperature. ZnO is advantageous in that it only a little increases the CTE of the glass-ceramic. Nevertheless, at too great a quantity (>4%), it no longer makes it possible to retain acceptable devitrification. The inventors have observed that it is preferable to limit the content of ZnO to 2.5% (1%≤ZnO≤2.5%) in order to improve the transmission in the red part of the visible spectrum of light (without (substantially) modifying the lightness, L*), and thus to improve the visibility of the red LED displays which emit generally at 625 nm. In this context, consideration may be given to accompanying FIG. 8.

$TiO_2$ (1.3% to 1.75%): this element acts as a nucleation agent. In too great a quantity (>1.75%), it generates unacceptable gray coloring (L* too small). In too small a quantity (<1.3%), it does not enable sufficient nucleation, which leads to β-spodumene crystals of very large size (as observed using a scanning electron microscope (see accompanying FIGS. 1A and 1B)), which harms the strength and the appearance of the material (appearance becomes non-uniform).

The inventors have the merit of having identified the above-specified overall composition with this narrow range of low contents for $TiO_2$, serving to obtain a compromise that is most advantageous with reference both to nucleation performance, and also to the looked-for appearance/coloring characteristics.

$ZrO_2$ (1% to 2%): this element also acts as a nucleation agent. It is advantageously present at at least 1.5% (this facilitates nucleation, giving rise to more numerous small crystals and to a ceramming duration that is shorter. Furthermore, when present at such a quantity, it makes it possible to obtain glass-ceramics that are opalescent, presenting particularly appropriate transmission at 625 nm ($T_{625\,nm}$) (see above)). At too great a quantity (>2%), it leads to unacceptable devitrification. Advantageously, with reference to this devitrification problem, it is present at a maximum of 1.9%. Its content thus lies most advantageously in that range 1.5% to 1.9% (1.5%≤$ZrO_2$≤1.9%).

$SnO_2$ (0.05% to 0.6%): this is thus the non-toxic fining agent used instead of and/or replacing $As_2O_3$ and/or $Sb_2O_3$ (see above). $SnO_2$ is advantageously used in the range 0.05% to 0.4% by weight, and most advantageously in the range 0.15% to 0.3% by weight. $SnO_2$ also acts as a nucleation agent. At large quantities (>0.6%) it increases devitrification of the glass and degrades the lightness of the material after ceramming.

BaO (0 to 4%), SrO (0 to 4%), CaO (0 to 2%), $Na_2O$ (0 to 2%), and $K_2O$ (0 to 2%): these elements are optionally present. In order to be effective, each of them, when present, is generally present at at least 0.1%. Otherwise stated, BaO is "not present" or is efficiently present, generally in the range 0.1 to 4%; SrO is "not present" or is efficiently present, generally in the range of 0.1 to 4% (see however later); CaO is "not present" or is efficiently present, generally in the range 0.1 to 2%; $Na_2O$ is "not present" or is efficiently present, generally in the range 0.1 to 2%; and $K_2O$ is "not present" or is efficiently present, generally in the range 0.1 to 2%. These elements remain in the vitreous phase of the glass-ceramics. These elements reduce the viscosity of the glass at high temperature, they (more particularly BaO) facilitate dissolution of $ZrO_2$, but they increase CTE (in particular $K_2O$ and $Na_2O$). According to a variant (which is advantageous), BaO is present, in the range 0.1 to 4%. With reference to managing the CTE (CTE≤20× $10^{-7}$/° C.), the sum of these elements must be less than or equal to 6% ($Na_2O+K_2O+BaO+SrO+CaO$≤6%), and the sum of $Na_2O$ plus $K_2O$ must be less than or equal to 2% ($Na_2O+K_2O$≤2%). In order to obtain CTE values≤15×$10^{-7}$/° C., it is highly advised to have $Na_2O$: 0 to 1%, $K_2O$: 0 to 1%, with $Na_2O+K_2O+BaO+SrO+CaO+$≤5% and $Na_2O+K_2O$≤1.5%. In order to obtain CTE value≤12×$10^{-7}$/° C., it is highly advised to have $Na_2O$: 0 to 1%, $K_2O$: 0 to 1%, with $Na_2O+K_2O+BaO+SrO+CaO+$≤5% and $Na_2O+K_2O$≤1%.

It may be observed that SrO is generally not present as an added raw material, insofar as it is a substance that is expensive. In such a context (SrO not present as an added raw material), if SrO is present, it is present only in the state of inevitable traces (<100 ppm), included as impurity in at least one of the raw materials used or in the cullet used.

Figure 4:
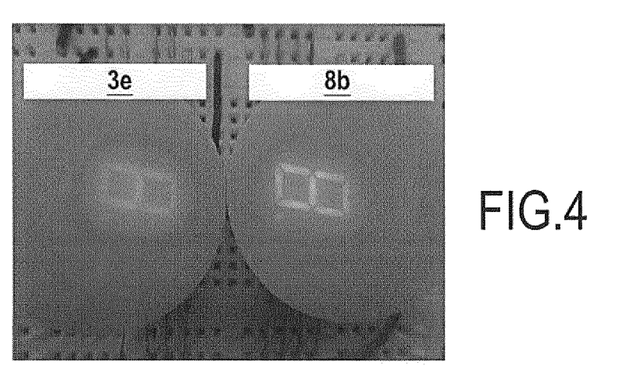
FIG. 4 shows the impact of such a partial substitution of BaO by CaO on the diffusion of light emitted by red LEDs. For a value of Y and a nucleation duration that are similar (i.e. Y≈21%-22% and a duration at $*T_n$=240 min (glass-ceramic 3e and glass-ceramic 8b)), this substitution leads to better visibility of red displays (which is explained mainly by a reduction in the size of the crystals).
Figure 5A:
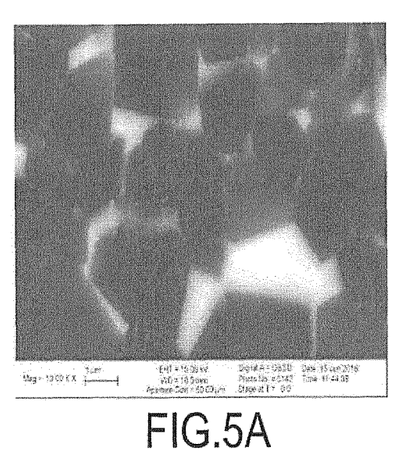
FIGS. 5A and 5B are photographs taken with a scanning electron microscope showing the microstructure of two glass-ceramics (glass-ceramics 3a and 3b) presenting the same composition (the composition of example 3) and obtained under different ceramming conditions (more precisely with a different duration at $*T_n$, 0 min for the glass-ceramic of example 3a at $*T_n$=730° C., and 21 min for the glass-ceramic of example 3d at the same temperature $*T_n$=730° C., with $*T_c$ (1105° C.) and the duration at $*T_c$ (21 min) being identical). The figures show that the nucleation duration at $*T_n$ has a large impact on the size of the crystals.
Figure 5B:
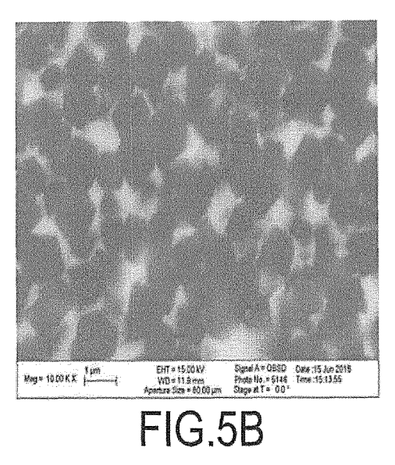

These elements, and most particularly BaO, SrO and CaO, also act on the microstructure and their contents can be optimized in order to obtain reduced diffusion for the wavelengths superior to about 600 nm, advantageously for applications where LED lighting at 625 nm is placed under an opalescent glass-ceramic plate (plate, the composition of which advantageously (but not necessarily (see above)) contains $Al_2O_3$>20% and MgO<1.2%). It is thus preferable to limit the content of BaO and of SrO. Surprisingly, it is with contents of BaO+SrO less than or equal to 1.5% (associated with "substitution" contents of CaO of at least 0.5%) that the haze level (diffusion percentage) is the lowest. In such a context, SrO is advantageously absent or only present as inevitable traces (see above) and BaO S 1.5%. This low haze level appears to be associated with small size for the β-spodumene crystals as observed with a scanning electron microscope. In this context, consideration may be given to accompanying FIGS. 4, 5A, and 5B.

$P_2O_5$ (0 to 2%) and $B_2O_3$ (0 to 2%): these elements are optionally present. In order to be effective, each of them, when present, should generally be present at at least 0.1%. Otherwise stated, $P_2O_5$ is "not present" or is efficiently present, generally in the range 0.1 to 2% and $B_2O_3$ is "not present" or is efficiently present, generally in the range 0.1 to 2%. $B_2O_3$ serves to reduce the viscosity of the precursor glass at high temperature but it increases the CTE of the glass-ceramic. Furthermore, these two elements accelerate crystallization. Their presence is thus not genuinely advantageous for obtaining glass-ceramics that are opalescent. It can however be understood that generally (for opalescent and opaque glass-ceramics), and more particularly in this context of opalescent glass-ceramics, one and/or the other may nevertheless be present (less than 200 ppm) not as an added ingredient but only as impurity present in a raw material used or in the cullet used. So, according to one variant, the composition of the glass-ceramics of the application is exempt of $P_2O_5$ or/and $B_2O_3$, with the exception of inevitable traces (impurities) (less than 200 ppm). The presence of $P_2O_5$ or/and $B_2O_3$ is a priori much more appropriate for obtaining glass-ceramics that are opaque.

However, in a context of opaque glass-ceramics that are subjected to large and numerous thermal shocks (as applies in particular to supports (or trays) within furnaces for heat treatment), which need to have a CTE that is very low, i.e. $CTE_{20-700°\,C.}$≤12×$10^{-7}$/° C., the composition of the glass-ceramics advantageously jointly contains $Al_2O_3$≤20% (in reference to the rate of crystallization (of the precursor glass), (MgO≤1.2% or MgO>1.2%, advantageously >1.2%), 0 to 1.5% of BaO (advantageously 0.1 to 1.5% of BaO (see above)), 0 to 1.5% of SrO, 0 to 1% of $Na_2O$, 0 to 1% of $K_2O$, less than 1% of $P_2O_5$ ($P_2O_5$<1%), less than 1% of $B_2O_3$ ($B_2O_3$<1%) with $Na_2O+K_2O+BaO+SrO+CaO$≤5% and $Na_2O+K_2O$≤1%.

$Fe_2O_3$ (≤500 ppm, advantageously≤200 ppm): the content of $Fe_2O_3$ is limited with reference to the looked-for whiteness. It is advantageously as small as possible. Nevertheless, the person skilled in the art is aware that the process carried out for preparing glass always brings a certain quantity of iron (present as impurity in the raw materials, or indeed added by recycling cullet). Under industrial conditions, it may be estimated that this quantity of $Fe_2O_3$ is (practically) always at least 100 ppm.

With reference to the looked-for whiteness, in order to maximize the value of L*, it is generally appropriate not to add coloring elements (such as oxides of transition metals or of rare earths). On these lines, if present, these elements are present as impurities. Nevertheless, adding such a coloring agent in order to adjust color should not be excluded. It is thus not possible to exclude the presence in a limited but effective quantity (generally <500 ppm) of a coloring agent of compensation coloring agent type (e.g. the presence of $CeO_2$ may be appropriate in order to increase b* (so as to confer a hue that is less blue and more yellow)).

The expression "not present" hereabove used corresponds to the absence of the element concerned or to its presence in an ineffective amount (generally <0.1%, in view of the above), more generally as trace, as impurity.

In the context of its first aspect, the present application relates in particular to glass-ceramics that are white and opalescent having the following composition:
60% to 70% of $SiO_2$,
>20% of $Al_2O_3$,
3.0% to 4.3% of $Li_2O$,
≤1.2% of MgO,
1 to 4% of ZnO,
0 to 4% of BaO,
0 to 4% of SrO,
0 to 2% of CaO,
1.3% to 1.75% of $TiO_2$,
1.5% to 2% of $ZrO_2$,
0.05% to 0.6% of $SnO_2$,
0 to 2% of $Na_2O$,
0 to 2% of $K_2O$,
no $P_2O_5$, no $B_2O_3$, with the exception of inevitable traces, with $Na_2O+K_2O+BaO+SrO+CaO≤6$% and $Na_2O+K_2O≤2$%, and a maximum of 500 ppm of $Fe_2O_3$.
Within said composition, BaO is advantageously present in the range 0.1 to 4% (see above) and/or ZnO is advantageously present in the range 1 to 2.5% (see above).

We here incidentally remind that such (white and opalescent) glass-ceramics have $CTE≤20\times10^{-7}$/° C. and that the conditions below:
$Na_2O$: 0 to 1%, $K_2O$: 0 to 1%, with $Na_2O+K_2O+BaO+SrO+CaO+≤5$% and $Na_2O+K_2O≤1.5$%,
$Na_2O$: 0 to 1%, $K_2O$: 0 to 1%, with $Na_2O+K_2O+BaO+SrO+CaO+≤5$% and $Na_2O+K_2O≤1$%,
are highly adviced for respectively, having CTE values ≤$15\times10^{-7}$/° C. and CTE values <$12\times10^{-7}$/° C.

Amongst these white and opalescent glass-ceramics (which are particularly white), are particularly preferred the ones having CTE values <$12\times10^{-7}$/° C. and:
+ suitable as substitutes for glass-ceramics sold by the Applicant under the name Kerawhite® (KW) (see above). These glass-ceramics have the above composition with: (as indicated above:
$Na_2O$: 0 to 1%, $K_2O$: 0 to 1%, with $Na_2O+K_2O+BaO+SrO+CaO+≤5$% and $Na_2O+K_2O≤1$%, and)
0.05% to 0.4% of $SnO_2$, preferably 0.15% to 0.3% of $SnO_2$; or
+ suitable as substitutes for glass-ceramics sold by the Applicant under the name Kerawhite Touch Control® (KWTC) (see above), insofar as they present transmission $T_{625\ nm}$ greater than 10% (which makes it possible to pass light from an LED emitting in the red and placed under the plate for display purposes). These glass-ceramics have the above composition with:

(as indicated above:
$Na_2O$: 0 to 1%, $K_2O$: 0 to 1%, with $Na_2O+K_2O+BaO+SrO+CaO+≤5$% and $Na_2O+K_2O≤1$%, and)
0.05% to 0.4% of $SnO_2$, preferably 0.15% to 0.3% of $SnO_2$;
≤1.5% BaO+SrO (advantageously ≤1.5% BaO with SrO absent or only present as inevitable traces; and 0.5% to 2% CaO.

In the context of its first aspect, the present application also relates in particular to glass-ceramics that are white and opaque, having the following composition:
60% to 70% of $SiO_2$,
≤20% of $Al_2O_3$,
3.0% to 4.3% of $Li_2O$,
>1.2% of MgO,
1 to 4% of ZnO,
0 to 4% of BaO, preferably 0 to 1.5% of BaO,
0 to 4% of SrO, preferably 0 to 1.5% of SrO,
0 to 2% of CaO,
1.3% to 1.75% of $TiO_2$,
1% to 2% of $ZrO_2$,
0.05% to 0.6% of $SnO_2$,
0 to 2% of $Na_2O$, preferably 0 to 1% of $Na_2O$,
0 to 2% of $K_2O$, preferably 0 to 1% of $K_2O$,
0 to 2% of $P_2O_5$, preferably <1% of $P_2O_5$,
0 to 2% of $B_2O_3$, preferably <1% of $B_2O_3$,
with $Na_2O+K_2O+BaO+SrO+CaO≤6$% and $Na_2O+K_2O≤2$%, and a maximum of 500 ppm of $Fe_2O_3$.
Within said composition, BaO is advantageously present in the range 0.1 to 4% (see above). It is preferably present in the range: 0.1 to 1.5%.

The preferred ranges mentioned above read independently the ones from the others. Advantageously, they read in combination for at least two of them, very advantageously in combination all together.

We here incidentally remind that such white and opaque glass-ceramics have $CTE≤20\times10^{-7}$/° C. and that the conditions below:
$Na_2O$: 0 to 1%, $K_2O$: 0 to 1%, with $Na_2O+K_2O+BaO+SrO+CaO+≤5$% and $Na_2O+K_2O≤1.5$%,
$Na_2O$: 0 to 1%, $K_2O$: 0 to 1%, with $Na_2O+K_2O+BaO+SrO<CaO+≤5$% and $Na_2O+K_2O≤1$%,
are highly adviced for respectively, having CTE values ≤$15\times10^{-7}$/° C. and CTE values ≤$12\times10^{-7}$/° C.

Amongst these white and opaque glass-ceramics (which are particularly white), the ones having CTE values <$12\times10^{-7}$/° C. and the composition given above with the hereafter specified conditions are particularly preferred (more particularly as constitutive material for supports or trays within furnaces for heat treatment):
(as indicated above:
$Na_2O$: 0 to 1%, $K_2O$: 0 to 1%, with $Na_2O+K_2O+BaO+SrO+CaO+≤5$% and $Na_2O+K_2O≤1$%, and)
0 to 1.5% of BaO, (advantageously 0.1 to 1.5% of BaO),
0 to 1.5% of SrO,
<1% of $P_2O_5$,
<1% of $B_2O_3$.

The ingredients entering in the composition of the glass-ceramics of the present application, or potentially entering therein, as identified above ($SiO_2$, $Al_2O_3$, $Li_2O$, MgO, ZnO, BaO, SrO, CaO, $TiO_2$, $ZrO_2$, $SnO_2$, $Na_2O$, $K_2O$, $P_2O_5$, $B_2O_3$, $Fe_2O_3$, coloring agent(s)) can indeed represent 100% by weight of the composition of glass-ceramics of the present application, however the presence of at least one other compound, in small quantity (generally less than or equal to 1% by weight) should not be totally excluded, a priori, providing it does not substantially affect the properties of the glass-ceramics.

The ingredients entering in the composition of the glass-ceramics of the present application, or potentially entering therein, as identified above ($SiO_2$, $Al_2O_3$, $Li_2O$, MgO, ZnO, BaO, SrO, CaO, $TiO_2$, $ZrO_2$, $SnO_2$, $Na_2O$, $K_2O$, $P_2O_5$, $B_2O_3$, $Fe_2O_3$, coloring agent(s)) thus generally represent at least 99% by weight or even 100% by weight (see above) of the composition of the glass-ceramics of the present application.

The glass-ceramics of the present application thus contain $SiO_2$, $Al_2O_3$, and $Li_2O$ as the main constituents of the β-spodumene solid solution (see below). This β-spodumene solid solution represents the main crystalline phase. This β-spodumene solid solution represents more than 80% by weight of the total crystallized fraction; it generally represents more than 90% by weight of said total crystallized fraction (see above). The size of the crystals (as observed with a scanning electron microscope (SEM)) is small (typically less than 5 micrometers (μm), and preferably less than 2 μm, so as to limit the haze level, in particular at 625 nm).

The glass-ceramics of the present application contain about 10% to about 30% by weight of residual glass.

The glass-ceramics of the present application thus present $CTE_{20-700°\,C.}\leq20\times10^{-7}/°\,C.$, or indeed $\leq15\times10^{-7}/°\,C.$, or even $\leq12\times10^{-7}/°\,C.$ (it is seen above that the low values of CTE are obtained more particularly with compositions containing: 0 to 1% of $Na_2O$, 0 to 1% of $K_2O$, with $Na_2O+K_2O+BaO+SrO+CaO\leq5\%$ and $Na_2O+K_2O\leq1\%$).

The glass-ceramics of the present application present satisfactory mechanical properties with good high temperature aging (see the results given in the examples below).

In its second aspect, the present application provides articles that are constituted at least in part out of a glass-ceramics of the present application as described above. Said articles are optionally constituted in full out of a glass-ceramic of the present application. Said articles advantageously consist in cooktops (which cooktops are thus white, opalescent, or opaque). Said cooktops may exist in various shapes, and in particular they may have two main faces that are smooth or one main face that is smooth and another main face with projections. The articles of the present application are nevertheless not limited to this sole application. They may in particular also constitute the constituent material of worktops, of cooking utensils, of microwave oven plates, or of supports for heat treatment (e.g. trays arranged inside furnaces suitable for heat treatments).

In a third aspect, the present application relates to lithium aluminosilicate glasses that are precursors to the glass-ceramics of the present application, as described above. In characteristic manner, said glasses present a composition that makes it possible to obtain said glass-ceramics. Said glasses generally present compositions that correspond to the compositions of said glass-ceramics, but the correspondence is not necessarily total insofar as the person skilled in the art is well aware that the heat treatment applied to glasses in order to obtain glass-ceramics can affect the composition of the material somewhat. The glasses of the present application are obtained in conventional manner by melting a charge of vitrifiable raw materials (raw materials making them up and present in appropriate proportions). Nevertheless, it can be understood (and this will not surprise the person skilled in the art) that the charge in question may include cullets. Such glasses are particularly advantageous in that they present a low viscosity at high temperature: $T_{30\,Pa\cdot s}<1660°\,C.$, associated with devitrification properties that are advantageous, in particular that are compatible with performing shaping methods involving rolling, floating, and pressing, i.e. a high viscosity at the liquidus (>300 Pa·s (3000 P)).

In its last aspect, the present application relates to a method of preparing an article constituted at least in part out of a glass-ceramic of the present application, as described above.

Such a method is a method by analogy.

In conventional manner, said method comprises heat treatment of a charge of vitrifiable raw materials (it can be understood that such a vitrifiable charge may contain cullet (see above)) under conditions that serve in succession to melt the charge and to fine it, followed by shaping the fined molten precursor glass (said shaping possibly being performed by rolling, by pressing, or by floating) followed by ceramming (or crystallization) heat treatment of the precursor glass that has been melted, fined, and shaped. The ceramming heat treatment generally comprises two steps: a nucleation step followed by a step of growing crystals of the β-spodumene solid solution. Nucleation generally takes place in a temperature range of 650° C. to 830° C., with crystals being grown in a temperature range of 850° C. to more than 1000° C. Concerning the duration of each of these steps, a duration may be mentioned in entirely non-limiting manner of about 5 minutes (min) to 500 min for nucleation and about 5 min to 60 min for crystal growth. With reference most particularly to the looked-for optical properties, the person skilled in the art knows how to optimize the temperatures and the durations of these two steps as a function of the composition of the precursor glasses.

Said method of preparing an article constituted at least in part out of a glass-ceramic of the present application thus comprises in succession:
melting a charge of vitrifiable raw materials (see above), followed by fining the resulting molten glass;
cooling the resulting fined molten glass and simultaneously shaping it into the shape desired for the intended article; and
ceramming heat treatment of said shaped glass, comprising a nucleation first step and a crystal growth second step.

The two successive steps for obtaining a shaped fined glass (precursor of the glass-ceramic) and for ceramming said shaped fined glass may be performed one immediately after the other or in a manner that is offset in time (on a single site or on different sites).

In characteristic manner, the charge of vitrifiable raw materials has a composition that makes it possible to obtain a glass-ceramic of the present application, thus presenting the composition by weight as specified above (containing $SnO_2$ as the fining agent (in the absence of $As_2O_3$ and $Sb_2O_3$ (see above))) and the ceramming performed on the glass obtained from such a charge is performed under conditions that generate a β-spodumene solid solution. The crystal-growth second step is performed at least in part at a temperature higher than 1000° C.

In the context of preparing an article, such as a cooktop, the precursor glass is cut out after being shaped, prior to being subjected to the ceramming heat treatment (the ceramming cycle). It is generally also worked and decorated. Such working and decorating steps may be performed before or after the ceramming heat treatment. By way of example, the decoration may be performed by screen printing.

The subject matter of the present application is illustrated below by the accompanying figures and the following examples. The figures and examples should be considered together.

In the same manner.

*$T_n$ and $T_c$ respectively represent the nucleation temperature and the crystal growth temperature (see later).

EXAMPLES

To produce 1 kilogram (kg) batches of precursor glass, the raw materials having the proportions specified in the first portions of Tables 1A, 1B, 1C, 1D, 1E, 2, and 3 below were mixed carefully (where the proportions are expressed in terms of oxides (as percentages by weight of oxides)).

For melting, the mixtures were placed in platinum crucibles. The crucibles containing said mixtures were then inserted into a furnace preheated to 1550° C. They were subjected therein to a melting cycle of the following type:
  temperature maintained at 1550° C. for 30 min;
  temperature rise from 1550° C. to 1670° C. in 1 hour (h); and
  temperature maintained at 1670° C. for 330 min.

The crucibles where then extracted from the furnace and the molten glass was poured onto a preheated steel plate. It was rolled to a thickness of 6 mm. Glass plates were thus obtained. They were annealed at 650° C. for 1 h and subsequently cooled slowly.

The properties of the glass obtained are indicated in the second portions of Tables 1A, 1B, 1C, 1D, 1E, 2, and 3 below.

The viscosities were measured with a rotational viscosity meter (Visco Tester VT550 HAAKE).

$T_{30\,Pa\cdot s}$ (° C.) corresponds to the temperature at which the viscosity of the glass is 30 Pa·s.

$T_{liq}$ (° C.) is the liquidus temperature. Specifically, the liquidus is given by a range of temperatures and associated viscosities: the range of temperatures given corresponds to the range of maximum temperatures for which there might be a risk of the glass devitrifying (unwanted formation of crystals). The higher temperature thus corresponds to the temperature above which no crystal is observed.

The devitrification characteristics (low and high temperatures of the liquidus) were determined as follows. Samples of glass (0.5 cubic centimeters ($cm^3$)) were subjected to the following heat treatment:
  placing into a furnace preheated to 1430° C.;
  maintaining this temperature for 30 min;
  lowering to the test temperature T at a rate of 10° C./min;
  maintaining the test temperature for 17 h; and
  cooling the samples rapidly by extracting them from the furnace.

The crystals present, if any, can then be observed by an optical transmission microscope using polarized light.

The ceramming cycle used is specified below:
  rapid temperature rise from 20° C. to 670° C., at a heating rate of 25° C./min;
  temperature rise from 670° C. to the nucleation temperature ($T_n$) at a heating rate of 5° C./min;
  pause at $T_n$ for the specified duration (which duration may be zero so there is no pause; nucleation then taking place during the temperature rise from 670° C. to $T_n$);
  temperature rise from $T_n$ to the crystal growth temperature ($T_c$) at a heating rate of 7° C./min;
  pause at $T_c$ for the indicated duration; and
  rapid cooling to 20° C., at a cooling rate of 25° C./min.

The parameters of the various ceramming cycles used are specified in Tables 1A, 1B, 1C, 1D, 1E, 2, and 3 below, where these parameters are maximum nucleation temperature ($T_n$), duration of heating at said $T_n$, crystal growth temperature ($T_c$), and duration of heating at said $T_c$.

It can be understood that for most of the examples, the results given were obtained after a plurality of ceramming treatments. Thus, for example 1, three ceramming cycles are specified leading to three ceramics 1a, 1b, and 1c, all three of which present the specified composition.

The properties of the glass-ceramics that were obtained are given in the last portions of Tables 1A, 1B, 1C, 1D, 1E, 2, and 3 below.

a) The glass-ceramics (with the exception of that of comparative example C4a (see FIGS. 1A and 1B)) contained a solid solution of β-spodumene as the main crystalline phase (which was verified by X-ray diffraction). Thus, the glass-ceramics 1b, 3d, 6a, and 13d contained respectively 97%, 96.6%, 96.7% and 97.1% (by weight) of β-spodumene phase (relative to the total crystallized fraction). The percentages of the β-spodumene phase were determined by the Rietveld method. The sizes of the β-spodumene crystals were obtained by observation using a scanning electron microscope (SEM). Those crystals are in fact agglomerates of crystallites. Said sizes of the crystals are given in micrometers. The values given in Tables 1A, 1B, 1C, 1D, and 3 correspond to the minimum and maximum sizes observable in FIGS. 1A (1B), 2, 3, and 5A and 5B.

L*, a*, and b* are the colorimetric coordinates of the CIELAB system (L*=lightness, and a* and b*=hue), measured with a colorimeter in reflection mode, under illuminant D65 with observation at 10°, on a sample having thickness of 4 mm.

Transmission and diffusion measurements were performed at 4 mm using a Varian spectrophotometer (Cary 500 Scan model), fitted with an integrating sphere of a diameter of 150 mm. From those measurements, there were calculated the total integrated transmission Y (or TL) (%) in the visible spectrum (in the range 380 nm to 780 nm) of the XYZ color space and the "haze" or level of diffusion (%) using the ASTM D 1003-13 standard (with illuminant D65 and 2° observer). Transmission values are given at 625 nm ($T_{625\ nm}$) and at 1600 nm ($T_{1600\ nm}$).

The coefficients of thermal expansion between ambient (20° C.) and 700° C. ($CTE_{20\text{-}700°\ C.}$) were measured using a high temperature dilatometer (DIL 402C, Netzsch) at a heating rate of 3° C./rain on glass-ceramic samples in the form of bars (50×4×4 mm).

The modulus of rupture (MOR) is a measure of the flexural strength of the material and was performed in a "ring-on-ring" configuration. The sample support ring had a diameter of 15 mm and the piston ring, situated above the sample, had a diameter of 5 mm. The downward speed of the piston ring was 0.5 mm/min. The values expressed in the tables are averages of the breaking stress values measured on polished samples having a size of 32 mm in diameter and 2.1 mm in thickness.

b) Examples 1 to 17 (Tables 1A, 1B, 1C, 1D and 1E) illustrate the present application.

Concerning these examples, it is appropriate to make the following comments.

The glass-ceramics exemplified are of a white color (see the specified values for L*, a*, and b*). Most are opalescent glass-ceramics; only glass-ceramics 12a and 13d are opaque glass-ceramics, as specified (see the specified values for Y).

The consideration in parallel of the values of L* and Y of glass-ceramics 13a, 13b, 13c and 13d confirms that when the L* value increases, the Y value decreases (hence, as indicated above, the unobviousness in obtaining glass-ceramics according to the present application: L*≥80 with Y≥18).

By considering the properties of glass-ceramics 13a, 14a, and 15a in parallel with the properties of glass-ceramics 13b and 14b it can be seen that, for similar ceramming, increasing the content of $Fe_2O_3$ from 190 ppm to 350 ppm and then to 430 ppm increases the value of a* and reduces the green component of the hue of the product.

By considering in parallel the levels of transmission at 1600 nm ($T_{1600\ nm}$) of the glass-ceramics 2a-2b, 3a-3c, 6a-6b, and 9b-9c it can be seen that the increase in the duration at $T_n$ increases said levels of transmission.

Lower contents of $ZrO_2$ (1.65 wt % (exs. 16 and 17) <1.8 wt % (exs. 1 to 15)) allow to obtain glasses showing higher viscosities at the liquidus temperature (which is advantageous in reference to the problem of devitrification during the glass rolling).

Figure 8:
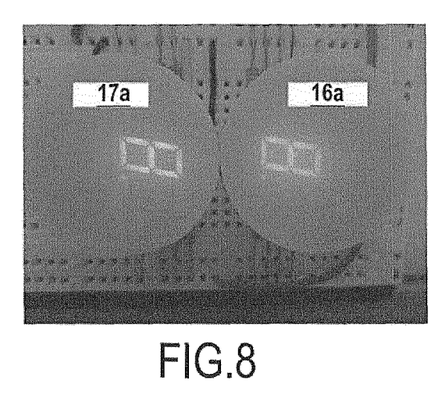
FIG. 8 shows the impact of lowering the ZnO content (ZnO being partly substituted by $SiO_2$ (in the present case)) on the visibility of the light emitted by red LEDs. For similar lightness values (L*≈82.0-82.4), the visibility of the red LEDs is better for glass-ceramic 17a compared to glass-ceramic 16a (having a higher content in ZnO).

The consideration in parallel of the levels of transmission at 625 nm ($T_{625\ nm}$) of the glass-ceramics 16a and 17a shows that the reduction of the content of ZnO (here substituted by $SiO_2$) allows to increase this transmission (31.4% for 17a compared to 29.4% for 16a), without degrading the lightness (L*: 82.45 for 17a compared to 82.05 to 16a) and, thus, to improve the visibility of the red LEDs (FIG. 8).

c) Examples CA and CB (Table 2) are comparative examples. They confirm the coloring effect of $SnO_2$.

Adding tin, in a composition having a high titanium content, greatly degrades the lightness (L*) and develops a β-spodumene material that is very gray.

d) Examples C1 to C5 (Table 3) are comparative examples.

Figure 1A:
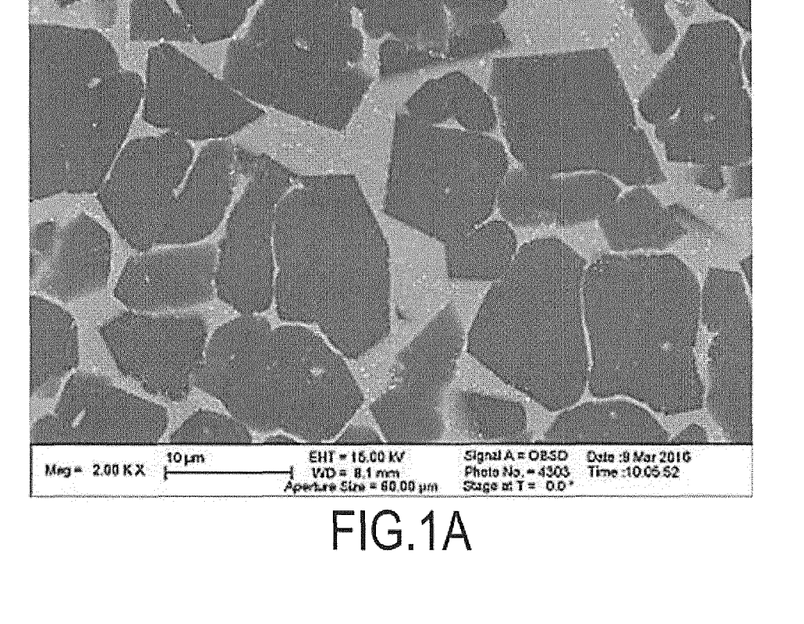
FIGS. 1A and 1B are photographs taken with a scanning electron microscope (at two different magnifications (see indicated scale)) showing the microstructure of a glass-ceramic (glass-ceramic C4a, presenting the composition specified in example C4), of composition containing too little $Ti_2O$. The crystals observed are too big and the proportion of the amorphous residual phase is larger than the proportions observed in FIGS. 2, 3, 5A, and 5B. This leads to a material presenting a low flexural strength (a low value for its modulus of rupture (MOR)).
Figure 1B:
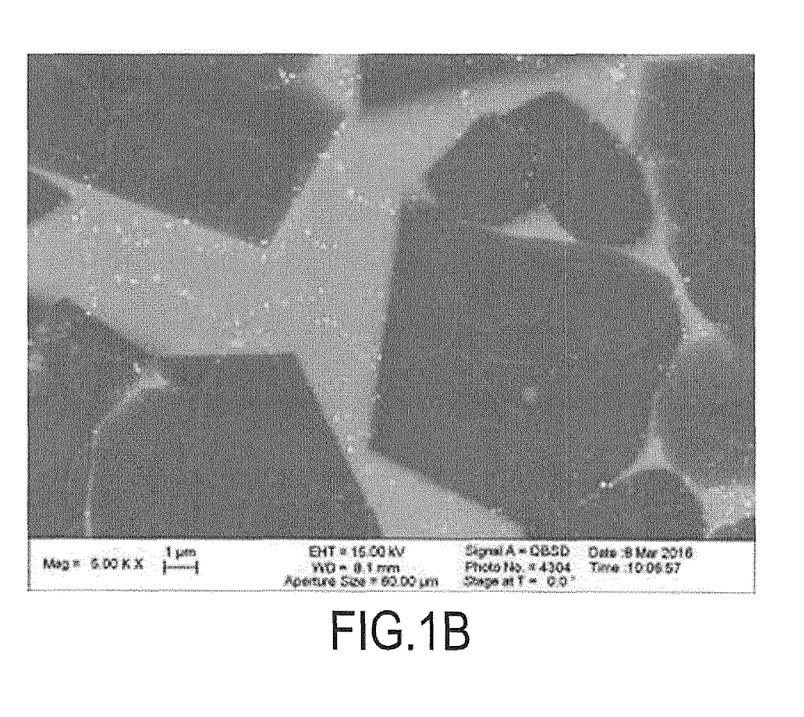
Figure 2:
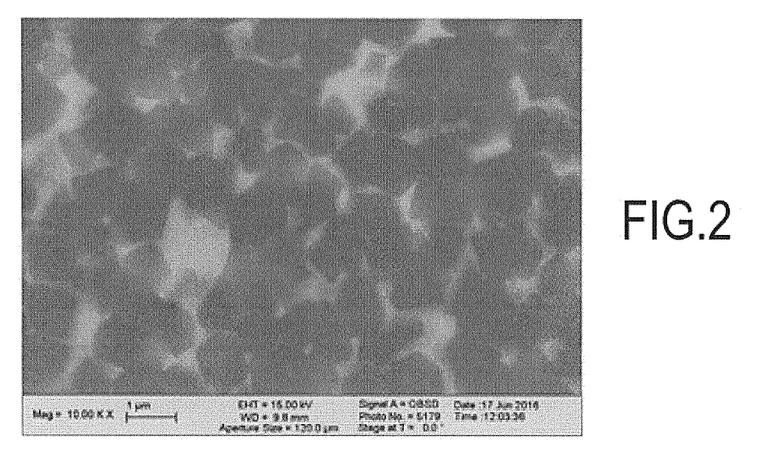
FIGS. 2 and 3 are photographs taken with a scanning electron microscope showing respectively the microstructure of a glass-ceramic of composition that does not contain CaO (glass-ceramic 3e, presenting the composition given in example 3) and of a glass-ceramic of composition that contains CaO, as a partial substitute for BaO (glass-ceramic 8b, presenting the composition given in Example 8). These figures show that partially substituting BaO with CaO reduces the size of the crystals.
Figure 3:
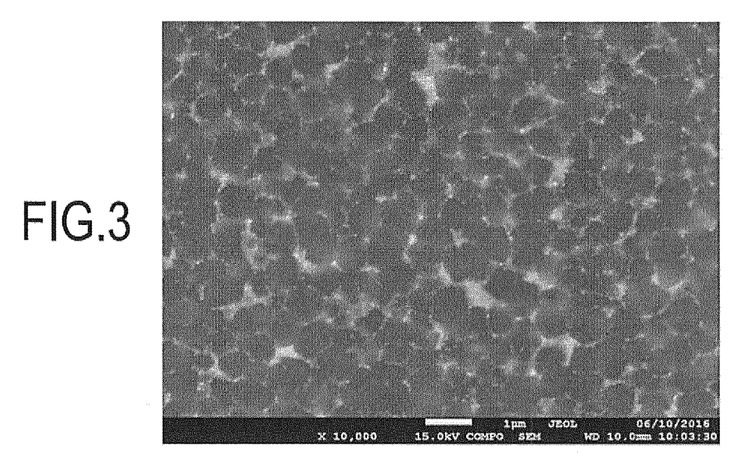

The compositions of the glass-ceramics (Cia, C2a, and C3a) of comparative examples C1 to C3 contain too much $TiO_2$ (see below), the composition of the glass-ceramic (C4a) of the comparative example C4 does not contain enough (the glass-ceramic obtained has crystals that are too big, which prevents the creation of a material of the KW or KWTC type (see figures (photos) 1A and 1B), which explains why it has low flexural strength).

The composition of the glass-ceramic C5a of comparative example C5 contains too much $SnO_2$ (lightness L* too small for a low Y and a great deal of devitrification).

On considering L* and Y value pairs, it can be understood that it is not possible to prepare glass-ceramics similar to a glass-ceramic of type KW (L*≈87-88, and Y≈10%-12%), or of KWTC type (L≈81-83 and Y≈18%-20%) with the compositions of examples C1, C2, C3, and C5 (specifically, increasing the value of L* of the glass-ceramics in question leads to a reduction in their Y value, and vice versa).

e) Considering certain examples and comparative examples in parallel leads to the following additional comments.

While using similar nucleation parameters ($T_n$=730° C. and duration at $T_n$=0 min), considering the following in parallel:

the values of the L*, a*, and b* color points of glass-ceramics C1a, C2a, and C3a, (of comparative examples C1, C2, and C3); and the values of the L*, a*, and b* color points of glass-ceramics 1a, 1b, 2a, 3a, and 3b (of examples 1, 2, and 3);

reveals the positive impact of decreasing the $TiO_2$ content. Glass-ceramics in accordance with the present application present greater lightness L* and values for a* that are less negative (hues that are less "green") and they are therefore whiter.

Considering the values of the L*, a*, and b* color points and the value of Y of the glass-ceramics 1b-3b and 1c-3d (of examples 1 and 3) reveals the positive impact of increasing the content of $Al_2O_3$. For similar Y values (about 11% or about 20.5%), increasing the alumina content from 18.26% to 20.5% by weight leads to materials having higher lightness L*, which are thus whiter.

Considering the values of the L*, a*, and b* color points and the Y values of the glass-ceramics 1a, 4a, and C5a (of examples 1 and 4 and of comparative example C5) reveals the negative impact of increasing the content of $SnO_2$. For similar Y values and nucleations (i.e. Y approximately 13%-15% and $T_n$=730° C., duration at $T_n$=0 min), increasing the tin content leads to a decrease of L* and an increase in the value of b* (hues that are "yellower").

TABLE 1A

| | Examples | | |
|---|---|---|---|
| | 1 | 2 | 3 |
| Composition (% by weight) | | | |
| $SiO_2$ | 67.445 | 65.185 | 65.205 |
| $Al_2O_3$ | 18.26 | 22.5 | 20.5 |
| $Li_2O$ | 3.33 | 4.1 | 3.33 |
| MgO | 1.17 | 0.4 | 1.17 |
| ZnO | 2.62 | 2.5 | 2.62 |
| BaO | 3.36 | 1 | 3.36 |
| $TiO_2$ | 1.5 | 1.6 | 1.5 |
| $ZrO_2$ | 1.8 | 1.8 | 1.8 |
| $SnO_2$ | 0.3 | 0.3 | 0.3 |
| $Na_2O$ | 0.2 | 0.2 | 0.2 |
| $P_2O_5$ | | | |
| $Fe_2O_3$ | 0.015 | 0.015 | 0.015 |
| CaO | | 0.4 | |
| $BaO + Na_2O + K_2O + CaO + SrO$ | 3.56 | 1.6 | 3.56 |
| $Na_2O + K_2O$ | 0.2 | 0.2 | 0.2 |
| Properties of glasses | 1 | 2 | 3 |
| $T_{30\ Pa \cdot s}$ (° C.) | 1653 | 1590 | 1611 |
| $T_{liq}$ (° C.) | | | |
| Viscosity at $T_{liq}$ (Pa · s) | | | |

Figure 6:
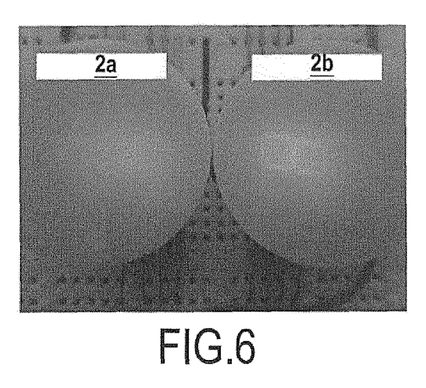
FIG. 6 shows the impact of this duration at $*T_n$ (via the impact on the size of the crystals) on the diffusion of light emitted by red LEDs. The glass-ceramics that were tested (Y≈17.5%) were the glass-ceramics 2a (duration at $*T_n$=0 min) and 2b (duration at $*T_n$=120 min).

| | Ceramming | | | | | | | | | |
|---|---|---|---|---|---|---|---|---|---|---|
| $T_n$ (° C.) | 730 | 730 | 730 | 730 | 730 | 730 | 730 | 730 | 730 | 730 |
| Duration at $T_n$ (min) | 0 | 0 | 120 | 0 | 120 | 0 | 0 | 120 | 120 | 240 |
| $T_c$ (° C.) | 1045 | 1060 | 1030 | 1070 | 1105 | 1105 | 1115 | 1125 | 1105 | 1100 |
| Duration at $T_c$ (min) | 21 | 21 | 21 | 21 | 21 | 21 | 21 | 21 | 21 | 21 |
| Properties of glass-ceramics | 1a | 1b | 1c | 2a | 2b | 3a | 3b | 3c | 3d | 3e |
| Reflection: L* | 81.6 | 83.8 | 80.1 | 85.7 | 83.0 | 88 | 89.2 | 86.6 | 82.7 | 82.4 |
| a* | −0.47 | −0.47 | −0.18 | −1.92 | −2.6 | −1.19 | −1 | −1.56 | −2.31 | −2.57 |
| b* | −0.61 | −1.14 | 0.67 | 4.05 | 4.75 | 0.58 | 0.69 | 0.54 | 0.41 | 0.07 |
| Transmission: Y (%) | 14.8 | 11.4 | 20.5 | 17.8 | 17.3 | 13.3 | 11.1 | 14.6 | 20.6 | 22 |
| Haze (%) | | | 99 | 99 | | | | | | 99 |
| $T_{625\ nm}$ (%) | 22.0 | 18.4 | 27.4 | 23.7 | 24.7 | 20.1 | 17.5 | 22.0 | 28.1 | 30.0 |
| $T_{1600\ nm}$ (%) | 60.0 | 59.3 | 69.4 | 66.7 | 75.2 | 63.9 | 61.9 | 66.3 | 71.1 | 72.5 |
| $CTE_{20-700°\ C.}$ (×$10^{-7}$/° C.) | 8.8 | 8.8 | | | | 9.6 | | | 9.4 | |
| Size of crystals (μm) | | | | | | 2.0-3.5 | | | 0.9-1.4 | 0.9-1.4 |
| MOR (MPa) | | | | | | 118 | | | | |
| Observations | | | FIG. 6 | FIG. 5A | | | | FIG. 5B | FIGS. 2 and 4 | |

TABLE 1B

| | Examples | | |
|---|---|---|---|
| | 4 | 5 | 6 |
| Composition (% by weight) | | | |
| $SiO_2$ | 67.295 | 66.055 | 67.195 |
| $Al_2O_3$ | 18.26 | 20.5 | 18.26 |
| $Li_2O$ | 3.33 | 3.73 | 3.33 |
| MgO | 1.17 | 1.17 | 1.17 |
| ZnO | 2.62 | 2.62 | 2.62 |
| BaO | 3.36 | 1.36 | 3.36 |
| $TiO_2$ | 1.5 | 1.5 | 1.75 |
| $ZrO_2$ | 1.8 | 1.8 | 1.8 |
| $SnO_2$ | 0.45 | 0.3 | 0.3 |
| $Na_2O$ | 0.2 | 0.2 | 0.2 |
| $P_2O_5$ | | | |
| $Fe_2O_3$ | 0.015 | 0.015 | 0.015 |
| CaO | | 0.75 | |
| $BaO + Na_2O + K_2O + CaO + SrO$ | 3.56 | 2.31 | 3.56 |
| $Na_2O + K_2O$ | 0.2 | 0.2 | 0.2 |
| Properties of glasses | 4 | 5 | 6 |
| $T_{30\ pa \cdot s}$ (° C.) | 1654 | 1614 | 1652 |
| $T_{liq}$ (° C.) | | | |
| Viscosity at $T_{liq}$ (Pa · s) | | | |

TABLE 1B-continued

| | Ceramming | | | |
|---|---|---|---|---|
| $T_n$ (° C.) | 730 | 750 | 730 | 730 |
| Duration at $T_n$ (min) | 0 | 120 | 0 | 120 |
| $T_c$ (° C.) | 1045 | 1070 | 1060 | 1040 |
| Duration at $T_c$ (min) | 21 | 21 | 21 | 21 |
| Properties of glass-ceramics | 4a | 5a | 6a | 6b |
| Reflection: L* | 81.2 | 85.5 | 83.5 | 82.9 |
| a* | −0.47 | −0.36 | −0.24 | −0.31 |
| b* | −0.41 | −0.41 | −0.89 | −1.33 |
| Transmission: Y (%) | 14.5 | 7.2 | 9.2 | 8.9 |
| Haze (%) | 99.5 | | | 99.5 |
| $T_{625\ nm}$ (%) | 21.8 | 13.3 | 15.9 | 15.5 |
| $T_{1600\ nm}$ (%) | 61.4 | 69.2 | 57.9 | 74.2 |
| $CTE_{20-700°\ C.}$ (×$10^{-7}$/° C.) | | | | |
| Size of crystals (μm) | | | 0.5-0.8 | 0.5-0.8 |
| MOR (MPa) | | | | |
| Observations | | | | |

TABLE 1C

| | Examples | | | |
|---|---|---|---|---|
| | 7 | 8 | 9 | 10 |
| Composition (% by weight) | | | | |
| $SiO_2$ | 67.045 | 66.455 | 65.385 | 66.835 |
| $Al_2O_3$ | 18.26 | 20.5 | 22.5 | 20 |
| $Li_2O$ | 3.33 | 3.33 | 4.1 | 3.45 |
| MgO | 1.17 | 1.17 | 0.4 | 1.17 |
| ZnO | 2.62 | 2.62 | 2.5 | 2.62 |
| BaO | 3.36 | 1.36 | 1 | 1.36 |
| $TiO_2$ | 1.75 | 1.5 | 1.6 | 1.5 |
| $ZrO_2$ | 1.8 | 1.8 | 1.8 | 1.8 |
| $SnO_2$ | 0.45 | 0.3 | 0.1 | 0.3 |
| $Na_2O$ | 0.2 | 0.2 | 0.2 | 0.2 |
| $P_2O_5$ | | | | |
| $Fe_2O_3$ | 0.015 | 0.015 | 0.015 | 0.015 |
| CaO | | 0.75 | 0.4 | 0.75 |
| $BaO + Na_2O + K_2O + CaO + SrO$ | 3.56 | 2.31 | 1.6 | 2.31 |
| $Na_2O + K_2O$ | 0.2 | 0.2 | 0.2 | 0.2 |
| Properties of glasses | 7 | 8 | 9 | 10 |
| $T_{30\,Pa \cdot s}$ (° C.) | 1653 | 1633 | 1589/1602 | 1637 |
| $T_{liq}$ (° C.) | | | 1350-1330 | |
| Viscosity at $T_{liq}$ (Pa · s) | | | 510-690 | |

| | Ceramming | | | | | | | |
|---|---|---|---|---|---|---|---|---|
| $T_n$ (° C.) | 730 | 750 | 750 | 750 | 730 | 750 | 750 | 750 |
| Duration at $T_n$ (min) | 120 | 60 | 240 | 240 | 0 | 120 | 240 | 240 |
| $T_c$ (° C.) | 1040 | 1070 | 1070 | 1090 | 1090 | 1100 | 1100 | 1065 |
| Duration at $T_c$ (min) | 21 | 21 | 21 | 21 | 21 | 21 | 21 | 21 |

Figure 7:
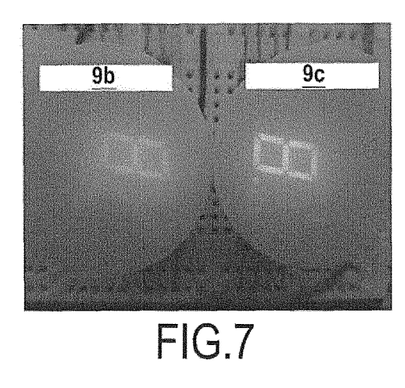
FIG. 7 shows the impact of this duration at $*T_n$ (via the impact on the size of the crystals) on the diffusion of the light emitted by red LEDs. The glass-ceramics tested (Y≈20.6%) were the glass-ceramics 9b (duration at $*T_n$=120 min) and 9c (duration at $*T_n$=240 min).

| Properties of glass-ceramics | 7a | 8a | 8b | 8c | 9a | 9b | 9c | 10a |
|---|---|---|---|---|---|---|---|---|
| Reflection: L* | 82.4 | 82.9 | 82.9 | 87.9 | 86.9 | 82.9 | 83.3 | 84.1 |
| a* | −0.52 | −2.95 | −2.8 | −1.43 | −0.46 | −1.7 | −1.82 | −1.13 |
| b* | −0.79 | 0.89 | 0.85 | 1.09 | 0.24 | 0.8 | 0.73 | 0.28 |
| Transmission: Y (%) | 9.5 | 21.8 | 21.0 | 11.6 | 13.1 | 20.7 | 20.6 | 14 |
| Haze (%) | | | 97 | | | 98 | 99 | |
| $T_{625\,nm}$ (%) | 16.4 | 29.3 | 28.9 | 18.6 | 18.4 | 27.4 | 27.5 | 21.4 |
| $T_{1600\,nm}$ (%) | 76.1 | 79.3 | 79.9 | 75.1 | 52.9 | 74.4 | 77.8 | 78.6 |
| $CTE_{20-700°\,C.}$ (×$10^{-7}$/° C.) | | 7.8 | 7.9 | | | 8.5 | 8.5 | |
| Size of crystals (μm) | | | 0.5-1.0 | | 05.-0.7 | 0.4-0.6 | | |
| MOR (MPa) | | | | | | | | |
| Observations | | | FIGS 3 and 4 | | | FIG. 7 | | |

TABLE 1D

| | Examples | | | | |
|---|---|---|---|---|---|
| | 11 | 12 | 13 | 14 | 15 |
| Composition (% by weight) | | | | | |
| $SiO_2$ | 64.105 | 66.815 | 66.761 | 66.745 | 66.737 |
| $Al_2O_3$ | 20.5 | 18.26 | 20.5 | 20.5 | 20.5 |
| $Li_2O$ | 3.33 | 3.33 | 3.33 | 3.33 | 3.33 |
| MgO | 1.17 | 1.8 | 1.17 | 1.17 | 1.17 |
| ZnO | 2.62 | 2.62 | 2.62 | 2.62 | 2.62 |
| BaO | 3.36 | 3.36 | 1 | 1 | 1 |
| $TiO_2$ | 1.5 | 1.5 | 1.5 | 1.5 | 1.5 |
| $ZrO_2$ | 1.8 | 1.8 | 1.8 | 1.8 | 1.8 |
| $SnO_2$ | 0.3 | 0.3 | 0.2 | 0.2 | 0.2 |
| $Na_2O$ | 0.2 | 0.2 | 0.2 | 0.2 | 0.2 |
| $P_2O_5$ | 1.1 | | | | |
| $Fe_2O_3$ | 0.015 | 0.015 | 0.019 | 0.035 | 0.043 |
| CaO | | | 0.9 | 0.9 | 0.9 |
| $BaO + Na_2O + K_2O + CaO + SrO$ | 3.56 | 3.56 | 2.1 | 2.1 | 2.1 |
| $Na_2O + K_2O$ | 0.2 | 0.2 | 0.2 | 0.2 | 0.2 |
| Properties of glasses | 11 | 12 | 13 | 14 | 15 |
| $T_{30\,Pa \cdot s}$ (° C.) | 1586 | 1630 | 1636/1609 | 1636 | |
| $T_{liq}$ (° C.) | | | 1350-1330 | | |
| Viscosity at $T_{liq}$ (Pa · s) | | | 560-750 | | |

TABLE 1D-continued

| Ceramming | | | | | | | | | | |
|---|---|---|---|---|---|---|---|---|---|---|
| $T_n$ (° C.) | 750 | 730 | 730 | 750 | 750 | 730 | 750 | 750 | 750 | 750 |
| Duration at $T_n$ (min) | 240 | 120 | 120 | 60 | 15 | 0 | 15 | 60 | 15 | 60 |
| $T_c$ (° C.) | 1100 | 1080 | 1025 | 1070 | 1100 | 1150 | 1160 | 1075 | 1110 | 1075 |
| Duration at $T_c$ (min) | 21 | 21 | 21 | 21 | 20 | 21 | 21 | 19 | 20 | 18 |

| Properties of glass-ceramics | 11a | 11b | 12a | 13a | 13b | 13c | 13d | 14a | 14b | 15a |
|---|---|---|---|---|---|---|---|---|---|---|
| Reflection: L* | 88.4 | 82.9 | 87.8 | 83.3 | 87.9 | 93.3 | 94.65 | 82.2 | 87.7 | 80.0 |
| a* | −0.7 | −1.4 | −0.52 | −2.43 | −0.9 | −0.28 | 0.1 | −1.1 | 0 | −0.7 |
| b* | 0.36 | 0.08 | 0.9 | −0.45 | −0.15 | 0.68 | 0.82 | −0.4 | −0.3 | −1.0 |
| Transmission: Y (%) | 7 | 16.8 | 0.1 | 22.1 | 11.5 | 3.6 | 0.4 | 17.9 | 7.3 | 19.6 |
| Haze (%) | | 99.5 | opaque | | | >99.5 | opaque | | | |
| $T_{625\,nm}$ (%) | 12.8 | 24.3 | 0.5 | 30.1 | 18.2 | 6.7 | 1.2 | 26.4 | 13.3 | 28.8 |
| $T_{1600\,nm}$ (%) | 64.0 | 68.5 | 33.1 | 79.4 | 69.1 | 35.2 | 19.1 | 76.7 | 60.7 | 76.0 |
| $CTE_{20-700°\,C.}$ (×10$^{-7}$/° C.) | | | | 8.0 | | | 10.3 | | | |
| Size of crystals (μm) | | | | 0.6-1.0 | | | | | | |
| MOR (MPa) | | | | 109 | | | | | | |
| Observations | | | | | | | | | | |

TABLE 1E

| | Examples | |
|---|---|---|
| | 16 | 17 |
| Composition (% by weight) | | |
| SiO₂ | 66.913 | 67.41 |
| Al₂O₃ | 20.5 | 20.5 |
| Li₂O | 3.33 | 3.33 |
| MgO | 1.17 | 1.17 |
| ZnO | 2.62 | 2.12 |
| BaO | 1 | 1 |
| TiO₂ | 1.5 | 1.5 |
| ZrO₂ | 1.65 | 1.65 |
| SnO₂ | 0.2 | 0.2 |
| Na₂O | 0.2 | 0.2 |
| P₂O₅ | | |
| Fe₂O₃ | 0.017 | 0.020 |
| CaO | 0.9 | 0.9 |
| BaO + Na₂O + K₂O + CaO + SrO | 2.1 | 2.1 |
| Na₂O + K₂O | 0.2 | 0.2 |
| Properties of glasses | 16 | 17 |
| $T_{30\,pa·s}$ (° C.) | 1621 | |
| $T_{liq}$ (° C.) | 1330-1310 | |
| Viscosity at $T_{liq}$ (Pa·s) | 770-1030 | |

| Ceramming | | | |
|---|---|---|---|
| Tn (° C.) | 750 | 750 | 750 |
| Duration at $T_n$ (min) | 45 | 10 | 60 |
| Tc (° C.) | 1050 | 1075 | 1055 |
| Duration at $T_c$ (min) | 21 | 21 | 22 |

| Properties of glass-ceramics | 16a | 16b | 17a |
|---|---|---|---|
| Reflection: L* | 82.05 | 88.0 | 82.45 |
| a* | −2.25 | −0.61 | −2.67 |
| b* | −0.04 | 0.11 | −0.38 |
| Transmission: Y (%) | 21.25 | 11.9 | 23.65 |
| Haze (%) | | | |
| $T_{625\,nm}$ (%) | 29.45 | 18.25 | 31.4 |
| $T_{1600\,nm}$ (%) | 77.4 | 64.9 | 79.4 |
| $CTE_{20-700°\,C.}$ (×10$^{-7}$/° C.) | 9.5 | | |
| Size of crystals (μm) | | | |
| MOR (MPa) | | | |
| Observations | | FIG. 8 | FIG. 8 |

TABLE 2

| | Comparative examples | |
|---|---|---|
| | CA | CB |
| Composition (% by weight) | | |
| SiO₂ | 64.268 | 63.988 |
| Al₂O₃ | 22.4 | 22.4 |
| Li₂O | 4.13 | 4.13 |
| MgO | | |
| ZnO | 0.8 | 0.8 |
| BaO | 3.6 | 3.6 |
| TiO₂ | 2.74 | 2.73 |
| ZrO₂ | 1.80 | 1.80 |
| SnO₂ | 0 | 0.29 |
| Na₂O | 0.25 | 0.25 |
| P₂O₅ | | |
| Fe₂O₃ | 0.012 | 0.012 |
| CaO | | |
| Na₂O + K₂O + BaO + SrO+ CaO | 3.85 | 3.85 |
| Na₂O + K₂O | 0.25 | 0.25 |

| Ceramming | | |
|---|---|---|
| $T_n$ (° C.) | 730 | 730 |
| Duration at $T_n$ (min) | 0 | 0 |
| $T_c$ (° C.) | 1070 | 1070 |
| Duration at $T_c$ (min) | 21 | 21 |

| Properties of glass-ceramics | CAa | CBa |
|---|---|---|
| Reflection: L* | 81.89 | 70.57 |
| a* | −1.55 | 0.02 |
| b* | −2.94 | 3.27 |

TABLE 3

| | Comparative examples | | | | |
|---|---|---|---|---|---|
| | C1 | C2 | C3 | C4 | C5 |
| Composition (% by weight) | | | | | |
| $SiO_2$ | 65.016 | 66.585 | 64.485 | 68.346 | 67.046 |
| $Al_2O_3$ | 22.72 | 20.6 | 22.5 | 18.26 | 18.26 |
| $Li_2O$ | 4.18 | 4.2 | 4.1 | 3.33 | 3.33 |
| MgO | 0.31 | 1.1 | 0.4 | 1.17 | 1.17 |
| ZnO | 0.19 | 1.4 | 2.5 | 2.62 | 2.62 |
| BaO | 1.22 | 0.8 | 1 | 3.36 | 3.36 |
| $TiO_2$ | 2.77 | 2.4 | 2.3 | 0.6 | 1.5 |
| $ZrO_2$ | 1.83 | 1.9 | 1.8 | 1.8 | 1.8 |
| $SnO_2$ | 0.3 | 0.3 | 0.3 | 0.3 | 0.7 |
| $Na_2O$ | 0.26 | 0.3 | 0.2 | 0.2 | 0.2 |
| $K_2O$ | 0.76 | | | | |
| CaO | 0.43 | 0.4 | 0.4 | | |
| $Fe_2O_3$ | 0.014 | 0.015 | 0.015 | 0.014 | 0.014 |
| $BaO + Na_2O + K_2O + CaO + SrO$ | 2.66 | 1.5 | 1.6 | 3.56 | 3.56 |
| $Na_2O + K_2O$ | 1.02 | 0.3 | 0.2 | 0.2 | 0.2 |
| Properties of glasses | C1 | C2 | C3 | C4 | C5 |
| $T_{30\,Pa\cdot s}$ (° C.) | 1624 | | | | |
| $T_{liq}$ (° C.) | 1350-1330 | | | | |
| Viscosity at $T_{liq}$ (Pa · s) | 700-950 | | | | |
| Ceramming | | | | | |
| $T_n$ (° C.) | 730 | 730 | 730 | 780 | 730 |
| Duration at $T_n$ (min) | 0 | 0 | 0 | 480 | 0 |
| Tc (° C.) | 1085 | 1060 | 1070 | 1100 | 1045 |
| Duration at $T_c$ (min) | 21 | 21 | 21 | 21 | 21 |
| Properties of glass-ceramics | C1a | C2a | C3a | C4a | C5a |
| Reflection: L* | 78.3 | 76.5 | 78.45 | 88.9 | 79.8 |
| a* | −2.92 | −3.25 | −3.32 | −0.89 | −0.54 |
| b* | −1.47 | 2.11 | 3.32 | 0.79 | 1.18 |
| Transmission: Y (%) | 16.8 | 17.7 | 16.6 | 13.8 | 13.4 |
| Haze (%) | 94 | 87.5 | 98 | | |
| $T_{625\,nm}$(%) | 26.6 | 27.8 | 25.3 | 19.9 | 20.8 |
| $T_{1600\,nm}$ (%) | 83.6 | 84.9 | 79.4 | 50.7 | 61.0 |
| $CTE_{20-700°\,C.}$ (×$10^{-7}$/° C.) | 14.5 | 10 | | 8.2 | |
| Size of crystals (μm) | | | | 7-17 | |
| MOR (MPa) | | | | 57 | |
| Observations | | | | FIGS. 1A and 1B | | f) Attention has also been given to resistance to aging at high temperature of glass-ceramic 9c of example 9. Its coefficient of thermal expansion between ambient (20° C.) and 700° C. ($CTE_{20-700°\,C.}$) and its modulus of rupture (MOR) after aging at 725° C. for 500 h and at 980° C. for 50 h have been measured. The results are given in Table 4 below. Said results show little change in the values of CTE and MOR (at the end of said thermal aging).

TABLE 4

| | Example 9 - Glass-ceramic 9c (750° C.-240 min + 1100° C.-21 min) | | |
|---|---|---|---|
| | $t_0$ | 725° C. 500 h | 980° C. 50 h |
| $CTE_{20-700°\,C.}$ | 8.5 | 8.4 | 9.4 |
| MOR (MPa) | | 134 | 118 |

The invention claimed is:

1. A glass-ceramic that is white, opalescent or opaque, of the lithium aluminosilicate (LAS) type, containing a solid solution of β-spodumene as the main crystalline phase, the composition of which, exempt of arsenic oxide and antimony oxide, with the exception of inevitable traces, comprises, expressed as percentages by weight of oxides:
60% to 70% of $SiO_2$,
18% to 23% of $Al_2O_3$,
3.0% to 4.3% of $Li_2O$,
0 to 2% of MgO,
1 to 4% of ZnO,
0 to 4% of BaO,
0 to 4% of SrO,
0 to 2% of CaO,
1.3% to 1.75% of $TiO_2$,
1% to 2% of $ZrO_2$,
0.05% to 0.6% of $SnO_2$,
0 to 2% of $Na_2O$,
0 to 2% of $K_2O$,
0 to 2% of $P_2O_5$,
0 to 2% of $B_2O_3$,
with $Na_2O+K_2O+BaO+SrO+CaO≤6\%$ and $Na_2O+K_2O≤2\%$, and a maximum of 500 ppm of $Fe_2O_3$, wherein the glass-ceramic comprises an optical transmission (Y) greater than or equal to 0.1% for a 4 mm thick panel.

2. The glass-ceramic according to claim 1, the composition of which comprises $ZrO_2$ at a content greater than or equal to 1.5% and less than or equal to 1.9%.

3. The glass-ceramic according to claim 1, the composition of which comprises 0.1 to 4% of BaO.

4. The glass-ceramic according to claim 1, the composition of which comprises $Na_2O$: 0-1%, $K_2O$:0-1%, with $Na_2O+K_2O+BaO+SrO+CaO \leq 5\%$ and $Na_2O+K_2O \leq 1.5\%$.

5. The glass-ceramic according to claim 1, the composition of which comprises $Na_2O$: 0-1%, $K_2O$: 0-1%, with $Na_2O+K_2O+BaO+SrO+CaO \leq 5\%$ and $Na_2O+K_2O \leq 1\%$.

6. The glass-ceramic according to claim 1, the composition of which comprises an $Al_2O_3$ content greater than 20%.

7. The glass-ceramic according to claim 6, the composition of which comprises a MgO content less than or equal to 1.2%.

8. The glass-ceramic according to claim 1, the composition of which comprises a BaO+SrO content less than or equal to 1.5% and a CaO content greater than or equal to 0.5%; the composition of which is free of SrO, with the exception of inevitable traces, and comprises a BaO content less than or equal to 1.5%.

9. The glass-ceramic according to claim 6, the composition of which is exempt, with the exception of inevitable traces, of $P_2O_5$ or $B_2O_3$.

10. The glass-ceramic according to claim 1, the composition of which contains an $Al_2O_3$ content less than or equal to 20%.

11. The glass-ceramic according to claim 10, the composition of which contains an MgO content greater than 1.2%.

12. The glass-ceramic according to claim 10, the composition of which contains:

0 to 1.5% of BaO,
0 to 1.5% of SrO,
0 to 1% of $Na_2O$,
0 to 1% of $K_2O$,
<1% of $P_2O_5$,
<1% of $B_2O_3$,
with $Na_2O+K_2O+BaO+SrO+CaO \leq 5\%$ and $Na_2O+K_2O \leq 1\%$.

13. An article that is constituted, at least in part, by the glass-ceramic according to claim 1, comprising a cooktop, a worktop, a cooking utensil, a microwave oven plate, or a support for heat treatment.

14. A method of preparing an article according to claim 13, the method comprising in succession:

melting a charge of vitrifiable raw materials, followed by fining the resulting molten glass;

cooling the resulting fined molten glass and simultaneously shaping it into the shape desired for the intended article; and applying ceramming heat treatment to the shaped glass, which heat treatment comprises a first step of nucleation and a second step of crystal growth;

wherein said charge of vitrifiable raw materials has a composition making it possible to obtain the glass-ceramic; and wherein said ceramming heat treatment comprises a crystal growth second step that is performed at least in part at a temperature higher than 1000° C.

* * * * *

UNITED STATES PATENT AND TRADEMARK OFFICE
CERTIFICATE OF CORRECTION

| | | |
|---|---|---|
| PATENT NO. | : 11,401,202 B2 | Page 1 of 1 |
| APPLICATION NO. | : 16/632740 | |
| DATED | : August 2, 2022 | |
| INVENTOR(S) | : Philippe Lehuede and Marie Comte | |

It is certified that error appears in the above-identified patent and that said Letters Patent is hereby corrected as shown below:

In the Claims

In Column 24, Line 48, replace "1 to 4% ZnO," with "2.12% to 4% of ZnO,"

Signed and Sealed this
Nineteenth Day of September, 2023

Katherine Kelly Vidal
*Director of the United States Patent and Trademark Office*